(12) United States Patent
Feldhaus et al.

(10) Patent No.: US 7,264,100 B2
(45) Date of Patent: Sep. 4, 2007

(54) DUAL-CLUTCH ASSEMBLY

(75) Inventors: Reinhard Feldhaus, Euerbach (DE); Markus Heiartz, Heidelberg-Eppelheim (DE); Igor Kister, Wuerzburg (DE); Thomas Dögel, Bad Kissingen (DE); Sebastian Vogt, Bad Neustadt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 169 days.

(21) Appl. No.: 10/529,103

(22) PCT Filed: Nov. 18, 2003

(86) PCT No.: PCT/EP03/12869

§ 371 (c)(1),
(2), (4) Date: Mar. 24, 2005

(87) PCT Pub. No.: WO2004/048794

PCT Pub. Date: Jun. 10, 2004

(65) Prior Publication Data

US 2006/0163019 A1    Jul. 27, 2006

(30) Foreign Application Priority Data

Nov. 22, 2002  (DE) ............................ 102 54 900

(51) Int. Cl.
*F16D 21/06*  (2006.01)
(52) U.S. Cl. ............... 192/48.8; 192/55.61; 192/110 B
(58) Field of Classification Search ................. 192/204
See application file for complete search history.

(56) References Cited

U.S. PATENT DOCUMENTS

| | | | |
|---|---|---|---|
| 6,053,295 A | * | 4/2000 | Orlamunder et al. ...... 192/55.3 |
| 6,634,477 B2 | | 10/2003 | Beneton et al. |
| 6,722,483 B2 | | 4/2004 | Damm et al. |
| 6,830,139 B2 | | 12/2004 | Carlson et al. |
| 2002/0060118 A1 | * | 5/2002 | Beneton et al. ............ 192/48.8 |
| 2003/0079953 A1 | * | 5/2003 | Carlson et al. ............ 192/48.8 |
| 2004/0206599 A1 | | 10/2004 | Hegerath |

FOREIGN PATENT DOCUMENTS

| | | |
|---|---|---|
| EP | 1 174 632 | 1/2002 |
| EP | 1 195 537 | 4/2002 |
| EP | 1 275 867 | 1/2003 |
| EP | 1 302 687 | 4/2003 |

* cited by examiner

*Primary Examiner*—Rodney H. Bonck
(74) *Attorney, Agent, or Firm*—Cohen Pontani Lieberman & Pavane LLP

(57) ABSTRACT

A dual clutch assembly includes a torsional vibration damper and a dual clutch. The vibration damper has a primary side which can be coupled to a driving member for joint rotation about an axis, a secondary side which is rotatable about the axis, and a damper element arrangement between the primary side and the secondary side. The dual clutch includes an input area and two output areas, the input area supporting the secondary side of the torsional vibration damper in at least one of an axial and radial direction with respect to the primary side, each output area being coupleable with a respective driven member so as to be fixed against rotation with respect to the driven member. A bearing arrangement supports the input area in at least one of an axial and a radial direction with respect to a stationary subassembly.

1 Claim, 4 Drawing Sheets

DUAL-CLUTCH ASSEMBLY

PRIORITY CLAIM

This is a U.S. national stage of application No. PCT/EP2003/012869, filed on 18 Nov. 2003. Priority under 35 U.S.C. §119(a) and 35 U.S.C. §365(b) is claimed from German Application No. 102 54 900.1, filed 22 Nov. 2002.

BACKGROUND OF THE INVENTION

1. Field of the Invention

The present invention is directed to a dual-clutch arrangement comprising a torsional vibration damper arrangement with a primary side which can be fixedly coupled with a driving member for joint rotation about an axis of rotation and a secondary side which is rotatable about the axis of rotation against the action of a damper element arrangement with respect to the primary side, and a dual clutch with an input area and two output areas, each of the output areas being coupleable with one of two driven members so as to be fixed with respect to rotation relative thereto.

2. Description of Related Art

U.S. Patent No. 6,634,477 discloses a dual clutch arrangement in which the primary side of a torsional vibration damper arrangement is fixedly coupled with a drive shaft as driving member by means of screw bolts. The secondary side of the torsional vibration damper arrangement is securely supported by a bearing support at the primary side in axial and radial direction and is rotatable with respect to the latter. The input area of the dual clutch is coupled substantially rigidly with the secondary side of the torsional vibration damper arrangement. In this case, these two subassemblies are only movable axially with respect to one another and the input area of the dual clutch is biased or pretensioned in the direction of the torsional vibration damper arrangement by a pretensioning spring that is supported with respect to a transmission housing.

A substantial problem in systems of this kind serving to transmit torque between a drive unit and a transmission is that there is a mechanical redundancy particularly in the engaged state of one of the coupling areas of the dual clutch. This means that if different subassemblies have an axial offset or an axial inclination with respect to one another, the redundancy leads to constraints or loads which put considerable stress on the existing bearing supports or supporting areas.

It is the object of the present invention to provide a dual clutch arrangement in which movement irregularities caused by a shaft offset or shaft tilt cannot lead to an overloading of the bearing areas.

SUMMARY OF THE INVENTION

According to a first aspect of the present invention, this object is met by a dual clutch arrangement comprising a torsional vibration damper arrangement with a primary side which can be fixedly coupled with a driving member for joint rotation about an axis of rotation and a secondary side which is rotatable about the axis of rotation against the action of a damper element arrangement with respect to the primary side, and a dual clutch with an input area and two output areas, each of the output areas being coupleable with one of two driven members so as to be fixed with respect to rotation relative thereto, wherein the secondary side of the torsional vibration damper arrangement is supported with respect to the primary side of the torsional vibration damper arrangement in axial direction and/or in radial direction by the input area of the dual clutch and a bearing arrangement which supports this input area with respect to a stationary subassembly.

Accordingly, substantially only one area of the bearing or support is provided, namely, with respect to a stationary subassembly. In the torsional vibration damper arrangement itself, the primary side and secondary side interact with one another substantially only by way of the damper element arrangement, possibly a friction device or the like. However, there is no bearing arrangement for axial or radial support in the torsional vibration damper arrangement itself.

In this connection, it can advantageously be provided that the stationary subassembly can preferably comprise a transmission housing.

According to another aspect of the present invention, the above-stated object is met by a dual clutch arrangement comprising a torsional vibration damper arrangement with a primary side which can be fixedly coupled with a driving member for joint rotation about an axis of rotation and a secondary side which is rotatable about the axis of rotation against the action of a damper element arrangement with respect to the primary side, and a dual clutch with an input area and two output areas, each of the output areas being coupleable with one of two driven members so as to be fixed with respect to rotation relative thereto, wherein the input area of the dual clutch is supported with respect to the secondary side of the torsional vibration damper arrangement one the one hand and with respect to a stationary subassembly on the other hand by a flexible coupling arrangement.

Since the input area of the dual clutch in this arrangement is coupled with the torsional vibration damper arrangement as well as with a stationary subassembly, which can also be constructed again as a transmission housing, by incorporating flexibility, the input area of the dual clutch can carry out compensating movements without leading to constraints and, therefore, overloading in the area of the system components serving as bearing support.

The flexible coupling arrangements preferably permit a movement of the input area of the dual clutch in radial direction and/or in axial direction. In order to provide for a defined support particularly in the torsional vibration damper arrangement, it is suggested that the secondary side of the torsional vibration damper arrangement is supported by an axial bearing and a radial bearing at the primary side of the torsional vibration damper arrangement.

According to another aspect of the present invention, a dual clutch arrangement is suggested which comprises a torsional vibration damper arrangement with a primary side which can be fixedly coupled with a driving member for joint rotation about an axis of rotation and a secondary side which is rotatable about the axis of rotation against the action of a damper element arrangement with respect to the primary side, and a dual clutch with an input area and two output areas, each of the output areas being coupleable with one of two driven members so as to be fixed with respect to rotation relative thereto, wherein the secondary side of the torsional vibration damper arrangement is supported with respect to the primary side of the torsional vibration damper arrangement by an axial/radial bearing arrangement which permits tilting of the secondary side with respect to the primary side.

In particular, when it is further provided that the secondary side of the torsional vibration damper arrangement is coupled with the input area of the dual clutch by a coupling arrangement so as to be fixed with respect to rotation relative to it, which coupling arrangement permits a tilting of the secondary side with respect to the input area, the secondary side can act as a compensating member which can compensate a possible axial offset between the primary side, for example, a drive shaft, and the input area of the dual clutch, for example, a driven shaft.

DETAILED DESCRIPTION OF THE PRESENTLY PREFERRED EMBODIMENTS

Figure 1:
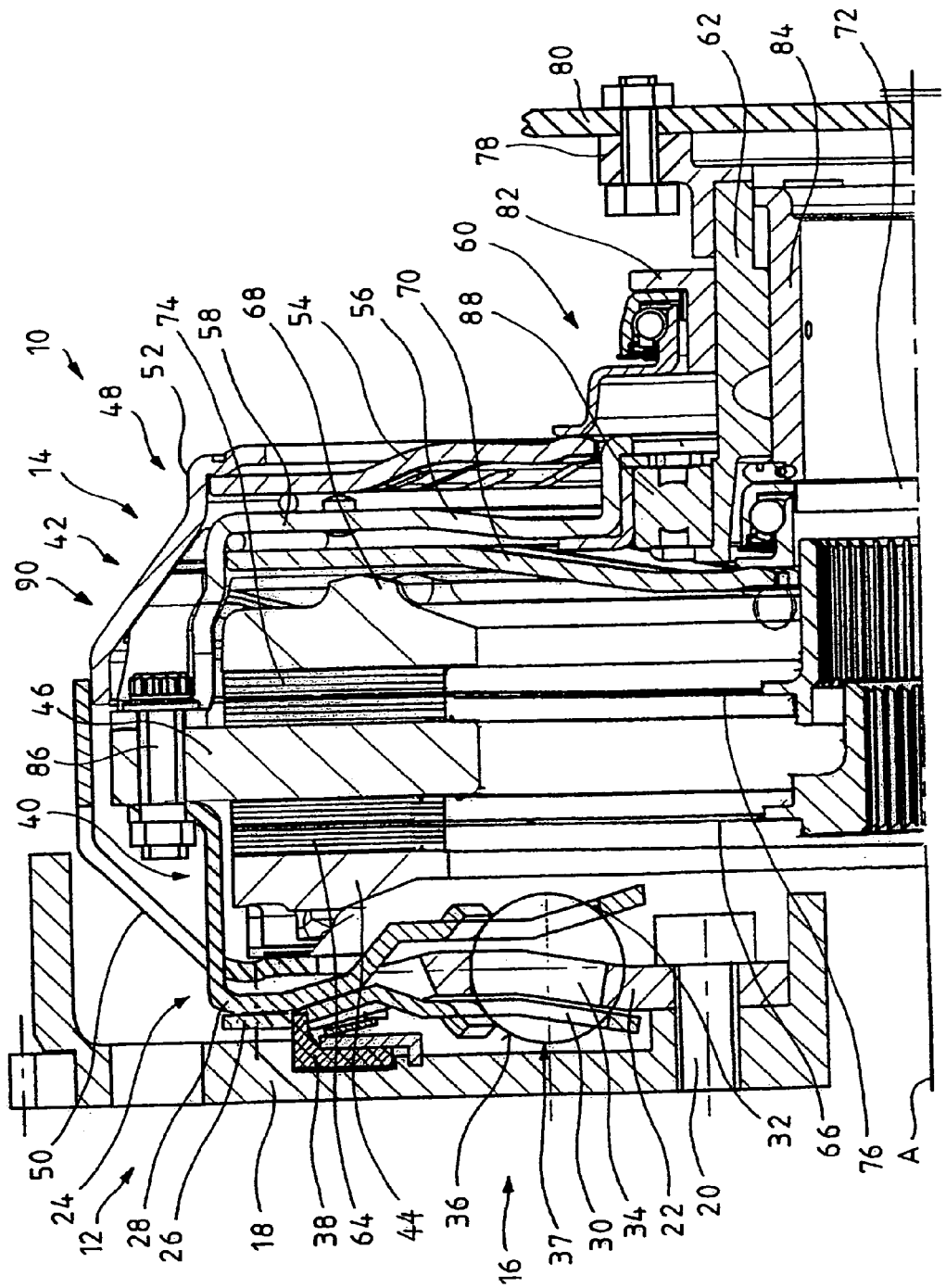
FIG. 1 is a view in partial longitudinal section showing a dual clutch arrangement according to the invention.

In FIG. 1, a dual clutch arrangement 10 comprises two system areas, namely, a torsional vibration damper arrangement 12, constructed as a dual mass flywheel, and a dual clutch 14.

The torsional vibration damper arrangement 12 has a primary side 16 which substantially comprises a primary mass 18 and a central disk element 22 which is fixedly connected to the latter by screw bolts 20. The primary side 16 is coupled by means of the screw bolts 20 with a driving member, e.g., a crankshaft of an internal combustion engine, so as to be fixed with respect to rotation relative to it.

The torsional vibration damper arrangement 12 further comprises a secondary side 24. This secondary side 24 is substantially formed of two cover disk elements 26, 28 which are formed, for example, by deformation of sheet-metal parts. These two cover disk elements 26, 28 lie on both sides of the central disk element 22 in their radial inner area. They are fixedly connected on the radial outer side, e.g., by screwing, riveting, welding, or the like.

Spring windows 30, 32, 34 are provided in the two cover disk elements 26, 28 and the central disk element 22 at a plurality of circumferential positions. The spring windows 30, 32, 34 have circumferential extensions—with respect to an axis of rotation A—which correspond to one another and serve to receive, respectively, damper springs 36 which, in their entirety, form a damper element arrangement 37. In the circumferential direction, these damper springs 36 are received in the spring windows 30, 32, 34 so as to be compressed. The cover disk elements 26, 28 are rotatable with respect to the central disk element 32 by compression of these springs 36, so that the primary side 16 in principle is also rotatable about the axis of rotation A with respect to the secondary side 24. To dissipate vibration energy during this relative rotation, which can also occur in the event of excessive torque variation, a permanently-acting or delayed-action friction device 38 of known construction can act between the primary side 16 and the secondary side 24.

The dual clutch 14 substantially comprises two coupling areas 40, 42. The first coupling area 40 has a pressing plate 44 which is coupled with an abutment plate 46 so as to be fixed with respect to rotation but axially movable relative thereto by tangential leaf springs or the like, this abutment plate 46 having the shape of an annular disk. An actuating force transmission arrangement 48 of the first coupling area 40 comprises two force transmission parts 50, 52 which are constructed, for example, in a cup-shaped manner and which span the abutment plate 46 axially. The force transmission element 50 is supported at the pressing plate 44, e.g., by means of a wear compensating device. The force transmission element 52 is acted upon by a force exerting arrangement 54 which is supported, in turn, at a base area 56 of a housing arrangement 58 that is fixedly connected to the abutment plate 46. An actuator mechanism 60 acts upon the radial inner area of the force exerting arrangement 54. This actuator mechanism 60 is only shown schematically and is substantially represented by a rotation decoupling bearing which is displaceable axially along a supporting element 52 for carrying out engagement processes in order to displace the radial inner area of the force exerting arrangement 54 in direction of the torsional vibration damper arrangement 12 and, in so doing, to displace the actuation force transmission arrangement 48 in the opposite direction and to displace the pressing plate 44 in the direction of the abutment plate 46. In this way, the friction linings 64 of a clutch disk 66 are clamped in and transmit a torque via this first coupling area 40 to a transmission input shaft that can be coupled to the clutch disk so as to be fixed with respect to rotation relative to it.

The second coupling area 42 likewise has a pressing plate 68 that is coupled with the abutment plate 46 and the housing 58, respectively, e.g., again by tangential leaf springs or the like, so as to be fixed with respect to rotation relative thereto, but is displaceable in direction of the axis of rotation A with resect to this subassembly. A force exerting arrangement 70 of the second coupling area 42 is supported on the radial outer side at the base area 56 of the housing 58 and can act upon the pressing plate 68 further inward radially. An actuator mechanism 72 acts on the radial inner end of this force exerting arrangement 70, so that this bearing can be displaced again along the supporting element 62 or in axial direction with respect to the latter during the movement of the mechanism, also substantially represented by a rotation decoupling bearing, and, by means of the movement of the force exerting arrangement 70 in the direction of the pressing plate 68, can move this pressing plate 68 in the direction of the abutment plate 46. In so doing, the friction linings 74 of a clutch disk 76 are clamped between the pressing plate 68 and the abutment plate 42 so that a torque can be transmitted to a second transmission input shaft in this engaged state of the second coupling area 42 by means of this coupling area 42, which second transmission input shaft is positioned coaxial to the first transmission input shaft already mentioned. The two clutch disks 66, 76 form respective output areas of the coupling areas 40, 42.

With respect to the two actuator mechanisms 60, 72, it is noted that hydraulic, pneumatic or mechanical systems can be used to generate their axial movement and that of their rotation decoupling bearing. Further, it is possible that the supporting element 62, which is fastened to a transmission housing 80 or the like by a carrier element 78, is provided with a thread at an inner circumferential side and an outer circumferential side, respectively, and elements 82, 84 that are rotatably supported on the supporting element 62 are provided with complementary threads so that a rotation of these elements 82, 84 also simultaneously results in their axial displacement and in the execution of engaging or disengaging processes.

The dual clutch 10 described above, like the torsional vibration damper 12 described above, can be constructed differently in different areas. For example, instead of the normally-open construction described above, in which an engagement force must be generated in the respective actuator mechanism 60, 72, the dual clutch can be constructed as a normally-closed system when using force accumulators in at least one of the coupling areas 40, 42.

It will be seen in the construction shown in FIG. 1 that there is no axial or radial bearing arrangement between the primary side 16 and the secondary side 24 in the area of the torsional vibration damper arrangement 12. A support with respect to force is provided in this case solely by the damper element arrangement 37 and the respective springs 36 thereof Due to the fact that there is generally a gap between the cover disk elements 26, 28 and the central disk element 22, a certain freedom of movement exists between the primary side and the secondary side 24 which is not limited by any bearing supports. The bearing support of the secondary side 24 is carried out in that the latter is fixedly connected by screw bolts 86 to the abutment plate 46 and, therefore, also to the housing 58 by means of the cover disk element 28. However, the housing 58 is supported axially and radially at the supporting element 62 by another rotation decoupling bearing 88, and this supporting element 62 is supported in turn in a stationary manner with respect to the transmission housing 80. Accordingly, the secondary side 24 is substantially fixedly connected to the input area 90 of the dual clutch 10, which input area 90 is in turn fixedly supported axially and radially with respect to the transmission housing 80, but also so as to be rotatable with respect to the latter. It should also be noted that the input area 90 of the dual clutch 10 substantially includes the abutment plate 46, the housing 58 and the components, particularly the pressing plates 44, 68, that are coupled therewith so as to be fixed with respect to rotation relative to them. Also, various system components used for actuation, such as the actuation force transmission arrangement 48, can be included in this input area 90.

This construction makes it possible to compensate for an axial offset or axial inclination between the drive shaft and the driven shafts because relative movements between the primary side 16 and secondary side 24 can occur in both radial and axial direction, particularly in the area of the torsional vibration damper arrangement 12. Wobbling movements can also be carried out in this area.

The assembly of this dual clutch arrangement 10 is carried out in such a way that the torsional vibration damper arrangement 12 is initially connected to the drive unit on the radial inner side by the screw bolts 20. Subsequently, the dual clutch 14 which has already been joined to a transmission is fitted axially and the screw connection can then be produced by means of the screw bolts 86. Accordingly, this screw connection functions as both rotational coupling and axial fastening. It is also possible, for example, to realize the rotational coupling function in another manner by means of toothing arrangements, rotational coupling pins or the like, while screw bolts or the like are used for fixing axially.

Figure 2:
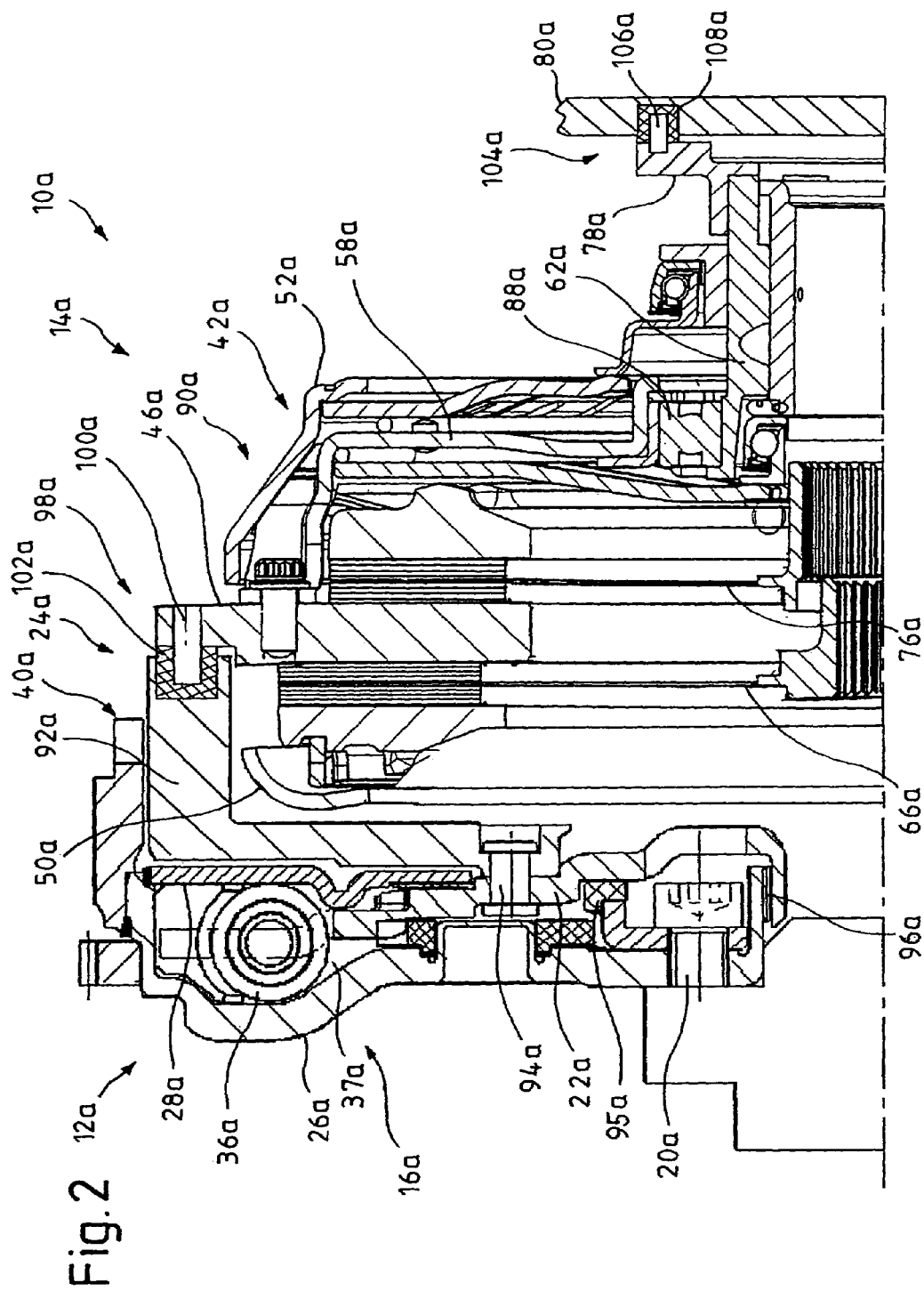
FIG. 2 is a view corresponding to FIG. 1 of a modified embodiment form.

FIG. 2 shows an embodiment form of a dual clutch arrangement according to the invention in which components corresponding with respect to construction or function to the components described above are designated by the same reference numbers with the addition of an "a". The basic construction corresponds to that described in the preceding and only the difference between the two will be described.

First, it will be seen in the area of the torsional vibration damper 12a that the two cover disk elements 26a, 28a now substantially form the primary side 16a, while the central disk element 22a, together with a mass part 92a, substantially forms the secondary side, these two parts being fixedly connected to one another by rivet bolts 94a. The central disk element 22a is supported axially with respect to the primary side 16a by an axial bearing ring 95a. A radial bearing support of the cover disk element 26a and central disk element 22a with respect to one another is provided by means of a radial bearing element 96a that is positioned between respective axially extending cylindrical portions of the cover disk element 26a and central disk element 22a.

The dual clutch 14, whose construction substantially corresponds to the construction described above, is coupled in the input area 90a, in this case in the area of the abutment plate 46a, with the mass part 92a of the secondary side 24a. For this purpose, a flexibly acting coupling arrangement 98a is provided. This can comprise, for example, at the abutment plate 46a, a plurality of coupling pins 100a which engage in elastomer material 102a which is provided at the mass part 92a and partially embedded therein. In this way, the input area 90a of the dual clutch 14a is flexibly coupled with the secondary side 24a of the torsional vibration damper arrangement 12a.

The coupling and support of the input area 90a of the dual clutch 14a with respect to a stationary system area, that is, for example, with respect to the transmission housing 80a, is also carried out by means of a flexibly acting coupling arrangement 104a. The latter can again comprise, for example, at the carrier element 78a already mentioned, coupling pins 106a which engage in elastomer material 108a. This elastomer material 108a is carried by the transmission housing 80a and is partially embedded therein. Accordingly, the dual clutch 14a is also flexibly supported at the other axial area by its input area 90a by means of the housing 58a, the rotation decoupling bearing 88a and the supporting element 62a. Therefore, in spite of any redundancy existing with respect to the quantity of fixing points or fastening points due to the elasticity introduced in the area where the dual clutch 14a is coupled on both sides, it is ensured that compensating movements can take place so that axial offsetting or relative axial inclinations can be compensated.

The dual clutch 14a is again initially fastened to the transmission in this arrangement, while the torsional vibration damper arrangement 12a is fastened to the drive unit. These two system areas are then moved together axially so that the pins 100a are inserted into the elastomer material 102a. In this way, the pins 100a with the elastomer material 102a simultaneously also function as a rotational coupling. Any elastomer material that can absorb corresponding loads, e.g., natural or synthetic rubber material, may be used. Metal bushings around which the elastomer material is molded can advantageously be provided at a plurality of circumferential positions.

Figure 3:
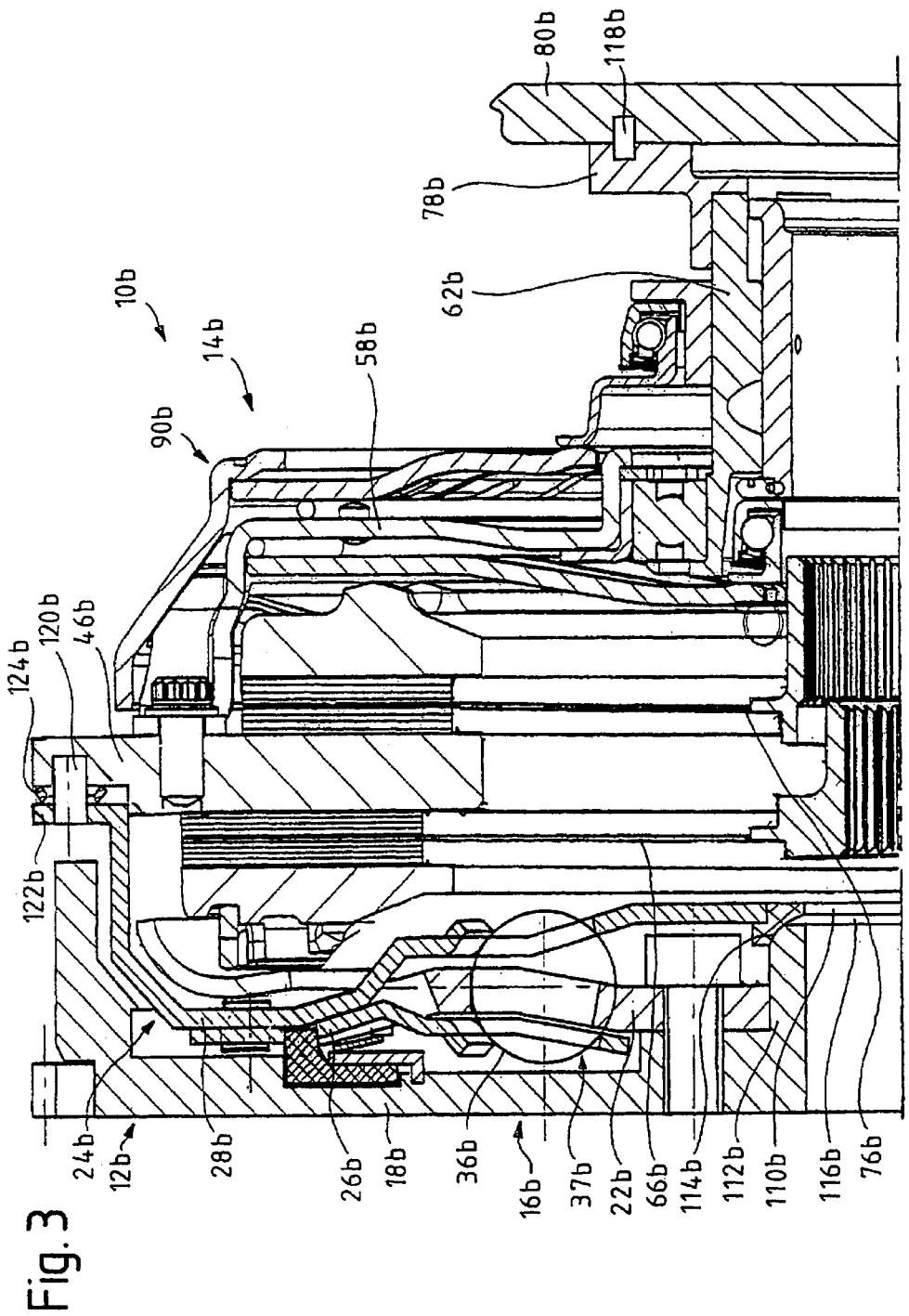
FIG. 3 is a view corresponding to FIG. 1 of a modified embodiment form.

Another embodiment form of a dual clutch arrangement according to the invention is shown in FIG. 3. Components which correspond with respect to construction or function to the components described above are designated by the same reference numbers with the addition of a "b". Again, only differences in construction will be described in the following.

In the variant of the dual clutch arrangement 10b shown in FIG. 3, in which the construction of the torsional vibration damper arrangement 12b corresponds substantially to the variant described with reference to FIG. 1, the secondary side 24b of the torsional vibration damper arrangement 12b is supported with respect to the primary side 16b, namely, with respect to a cylindrical shoulder 112b located on the radial inner side of the mass part 18b, by a bearing arrangement which substantially comprises a bearing ring 110b. This cylindrical shoulder 112b has a spherical or convex end face 114b at its axial end. The bearing ring 100b has a concave annular surface 116b which corresponds to this spherical or convex end face 114b and which rests at the surface 114b of the mass part 18b. The cover disk element 28b of the secondary side 24b is supported in its radial inner area on the bearing ring 110b. A wobble decoupling between the primary side 16b and the secondary side 24b is also provided in this case because of the practical movability—already mentioned with reference to FIG. 1—of the two cover disk elements 26b, 28b with respect to the central disk element 22b, which is substantially not impeded by the bearing ring 100b and its movability on the convex surface 114b. Slight relative axial movements of these two subassemblies with respect to one another can also take place.

The dual clutch 14b is held by its input area 90b by the supporting element 62b and the carrier element 78b with respect to a stationary subassembly, that is, for example, the transmission housing 80b. In this case, coupling pins 118b can be used like the screw bolts shown in FIG. 1. In this way, a defined support of the input area 90b, that is, substantially also the housing 58b and the abutment plate 46b, is realized. In order to allow for the aforementioned wobbling movement of the secondary side 42b with respect to the primary side 16b, a rotational driving coupling permitting a decoupling of this kind is provided between the cover disk element 28b and the abutment plate 46b. For this purpose, rotational coupling pins 120b which engage in associated openings of a radial flange 122b of the cover disk element 28b are provided, e.g., at the abutment plate 46b. A disk spring 124b which provides an axial pretensioning for the secondary side 24b can be associated with each of these pins 120b so as to provide stationary contact between the two surfaces 114b, 116b. In order to realize the wobbling decoupling mentioned above, it is advantageous to provide an at least slight movement play permitting tilting in the area where the pins 120b fit into the associated openings of the cover disk element 28b. Of course, other flexible coupling arrangements, e.g., the coupling arrangement shown in FIG. 2, or a decoupling by tangential leaf springs or the like can also be realized. It is also possible, of course, to use other pretensioning elements such as spring rings or the like.

The assembly of this embodiment form is carried out in that the torsional vibration damper arrangement 12b is again first screwed onto the drive shaft. The dual clutch 14b which is already joined to the transmission is then advanced axially and the coupling with the cover disk element 28b is realized in the area of the pins 120b. This can be carried out in such a way that the pins 120b are not inserted into associated openings until after the dual clutch 14b is advanced axially.

Figure 4:
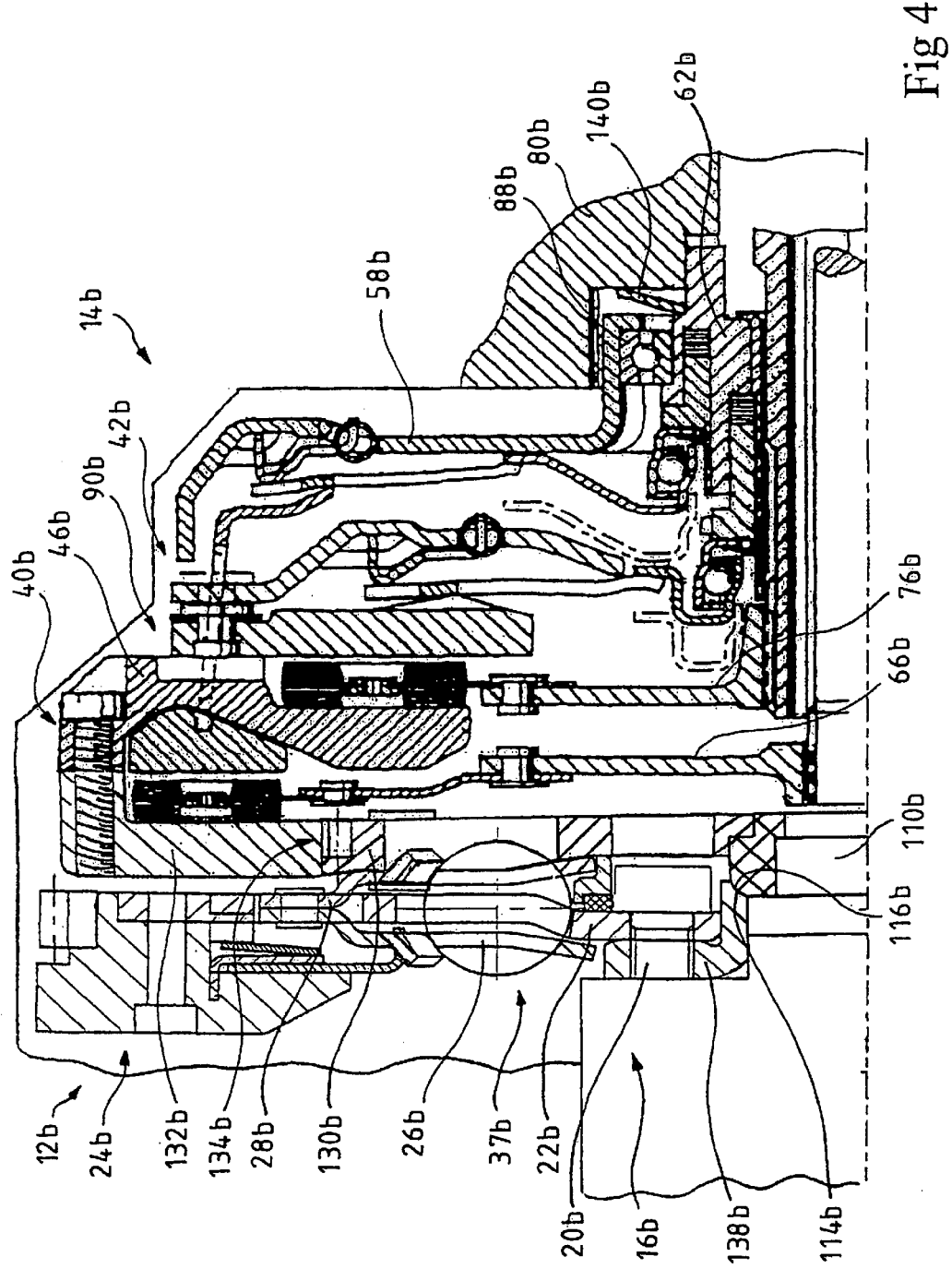
FIG. 4 is a view corresponding to FIG. 1 of a modified embodiment form.

FIG. 4 shows a modification of the embodiment form shown in FIG. 3. In this case, the secondary side 24b comprises two ring disk elements 130b and 132b which are nested one inside the other coaxially. The ring disk element 130b is fixedly connected to the cover disk element 28b, for example, by riveting, while the radial outer ring disk element 132b is fixedly connected to the input area 90b of the dual clutch 14b by screwing. These two ring disk elements 130b, 132b are decoupled from one another in an engagement area 134b in which the two ring disk elements 130b, 132b adjoin one another, for example, by forming teeth and possibly with the intermediary of flexible materials, in such a way that a rotational driving function is realized in practice by a positive engagement, but the inner ring disk element 130b is otherwise at least slightly tiltable with respect to the outer ring disk element 132b.

Also provided in this embodiment form is a bearing ring 100b at which the inner ring disk element 130b of the secondary side 24 is now supported on the one hand and which is supported again with a convex surface 116b at a correspondingly concave surface 114b of the primary side 16b, namely, at a supporting element 138b which is coupled with the central disk element 22b by the screw bolts 20b. In this way, the inner ring disk element 130b, together with the two cover disk elements 26b, 28b, is again tiltable with respect to the primary side 16b.

The input area 90b of the dual clutch 14b is supported in the area of its housing 58b by the rotation decoupling bearing 88b and the supporting element 62b, mentioned above, with respect to the transmission housing 80b. In this case, a pretensioning spring 140b ensures that the entire input area 90b is pretensioned in the direction of the torsional vibration damper arrangement 12b. An axial movement stop is provided in the area of the coupling of the two ring disk elements 130b. The pretensioning spring 140b ensures that the bearing ring 100b remains in firm bearing contact with the surface 114b at the supporting element 138b. This system is again constructed in such a way that the torsional vibration damper arrangement 12b is initially fastened to the drive element. The dual clutch 14b which is already joined to the transmission is then fitted and the outer ring disk element 132b is already fixedly connected to the abutment plate 46b and, as is shown in FIG. 4, itself forms an abutment plate for the first coupling area 40b. The two ring disk elements 130b, 132b then enter into a coupling interaction in their coupling area 134b while retaining the wobbling movability of the secondary side 24b, mentioned above, to a limited extent.

The invention provides various possibilities for coupling different system areas of a dual clutch arrangement which either avoid redundancy in fastening and, therefore, also permit compensating movements in the event of axial offset or axial relative tilting or which permit a certain relative movement in case of redundancy due to a flexible connection of different system areas.

What is claimed is:

1. A dual clutch assembly comprising:
    a torsional vibration damper comprising a primary side which can be coupled to a driving member for joint rotation about an axis, a secondary side which is rotatable about the axis, and a damper element arrangement between the primary side and the secondary side;
    a dual clutch comprising an input area and two output areas, each said output area being coupleable with a respective driven member so as to be fixed against rotation with respect to said driven member;
    an axial/radial bearing arrangement which supports the secondary side of the torsional vibration damper arrangement with respect to the primary side so that the secondary side can tilt with respect to the primary side; and
    a coupling arrangement which fixes the input area of the dual clutch against rotation with respect to the secondary side of the torsional vibration damper arrangement, said coupling arrangement permitting the secondary side to tilt with respect to the input area.

* * * * *